March 11, 1924.
D. S. ANTHONY
BORING BAR HOLDER
Filed July 18, 1922
1,486,407
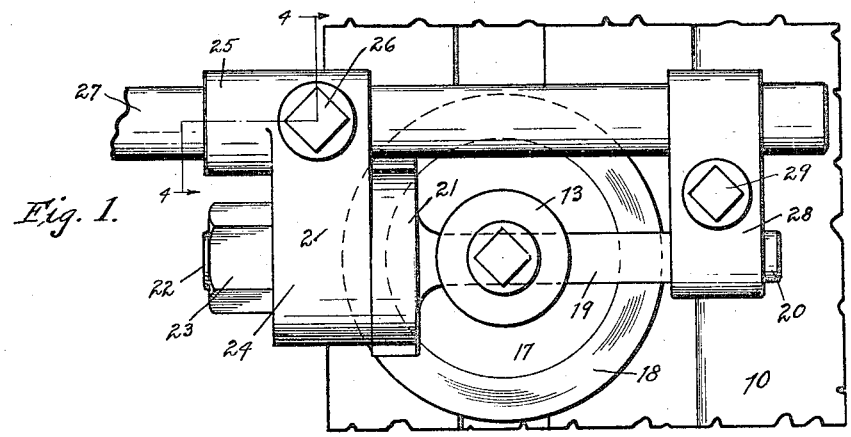
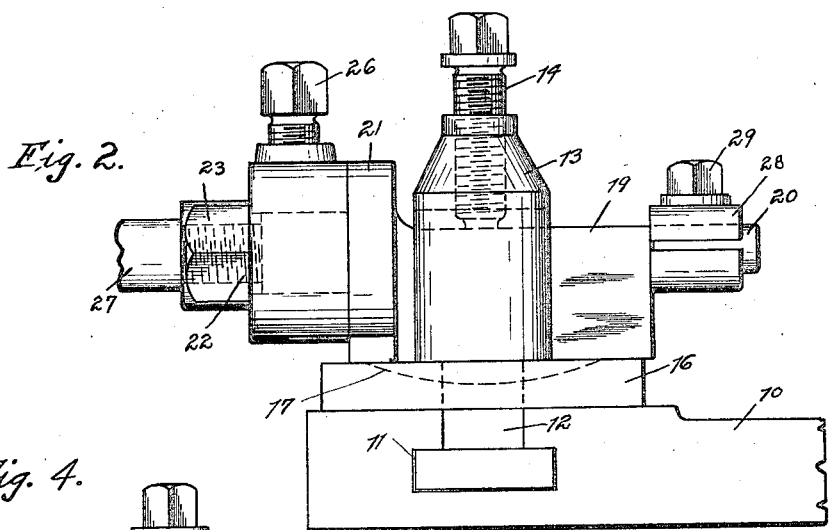
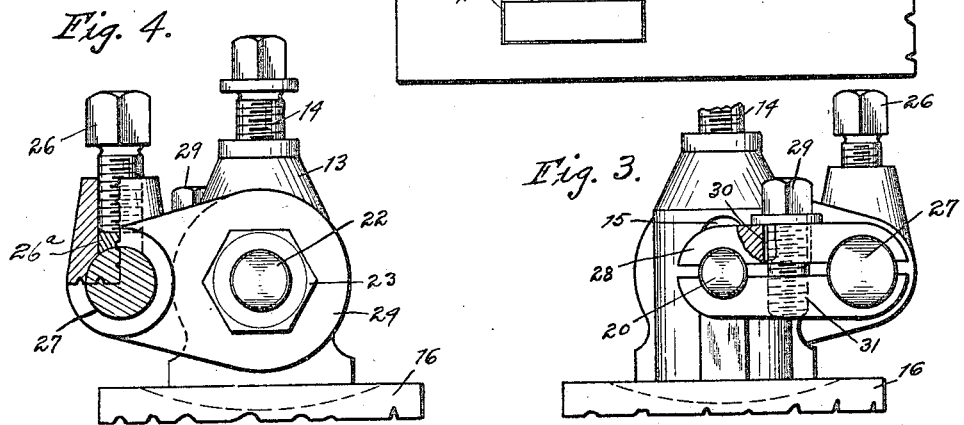

Patented Mar. 11, 1924.

1,486,407

UNITED STATES PATENT OFFICE.

DAVID S. ANTHONY, OF SAN ANTONIO, TEXAS.

BORING-BAR HOLDER.

Application filed July 18, 1922. Serial No. 575,901.

*To all whom it may concern:*

Be it known that I, DAVID S. ANTHONY, a citizen of the United States, and a resident of San Antonio, in the county of Bexar and State of Texas, have invented a certain new and useful Boring-Bar Holder, of which the following is a specification.

The object of my invention is to provide a boring bar holder of simple, durable and inexpensive construction, especially designed to support and hold what is known as a boring bar, such as used on lathes for machining the interior surface of cylindrical openings.

A further object is to provide a boring bar holder which may be easily and quickly applied to the tool rest of a lathe, and when applied will rigidly and firmly support and hold the boring bar in operative relation to the work.

A further object is to provide a boring bar holder so arranged and constructed that the boring bar may be easily and quickly attached or detached, and when attached may be adjusted in a number of positions relative to the base of the tool rest.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved boring bar holder showing the manner in which it is mounted on a segment of a tool rest.

Figure 2 is a side elevation of Figure 1.

Figure 3 is an end elevation taken at the right hand end of Figure 2.

Figure 4 is a detail sectional view taken on the line 4—4 of Figure 1.

The numeral 10 indicates a tool rest of a lathe which is of the ordinary construction and provided with a dovetail groove 11 in which is mounted the tool supporting pin 12, having on its upper end a tool supporting post 13, the upper end of the post being provided with a set screw 14.

The post 13 is provided with a slot 15 which is for the purpose of receiving the tool.

Mounted on top of the tool rest 10 and around the pin 12 is a washer 16. The upper surface of the washer 16 is dished or concaved at 17 in such a manner that an annular face 18 is provided, the said face being parallel with the bottom face of the washer. These parts are of the ordinary construction and form no part of my present invention, and are illustrated to merely show how the device is applied and attached.

My improved device comprises a bracket or supporting member 19 which is rectangular in cross section and has its width arranged in a vertical plane and is of substantially the same size as a standard shank of a lathe tool and designed to be supported in the groove 15 in the same manner as the ordinary lathe tool, as clearly illustrated in Figures 1 and 2. The upper right hand end of the bracket 19, as illustrated in Figure 2, is provided with a horizontally extending cylindrical portion 20, the diameter of the member 20 being substantially equal to the thickness of the body portion of the bracket 15. The opposite end of the body portion is provided with a transversely arranged head member 21. This head member 21 is of a length considerably greater than the width of the member 19, and of a height greater than the height of the said member 19.

The outer face of the head member 21 is provided with a pin 22, the outer end of which is screw threaded and designed to receive a nut 23. Rotatively mounted on the pin 22, is an arm 24 which is designed to rest substantially horizontally when in a normal position, as clearly illustrated in the figures, with one end extending beyond one side of the head member 21. This extending end is provided with a boss 25 which is provided with suitable openings extending parallel with the pin 22 and the member 19.

The upper face of the boss 25 is provided with a set screw 26, the opening of the boss 25 being designed to receive the boring bar 27 which is of the ordinary construction.

The inner end of the set screw opening is provided with a hardened plug 26ᵃ having its inner end concaved to fit between the boring bar and the set screw 26 to prevent the set screw from injuring the said bar.

The member 20 is designed to carry a two-pieced clamp member 28, the said clamp being designed to engage both the member 20 and one end of the boring bar 27, the two clamp members being adjustably secured to said bars by means of a set screw 29. The upper one of the members 28 is provided with an opening 30 through which the set screw passes, the lower one being provided with a threaded opening 31.

By this arrangement it will be seen that the boring bar 27 is supported at two points, the clamp 28 serving as an auxiliary support for steadying the free end of the boring bar.

By loosening the nut 23 and the set screw 29, it will be seen that the bar 27 may be swung about the member 20 and the pin 22 of the bar may be carried at different elevations relative to the member 10, or the said bar may be swung to a position on the opposite side of the head member 21, or it may be supported vertically above the said head member. After the bar has been swung to position, the nut 23 and the set screw 29 are again tightened and the bar is rigidly held in position.

It will be noticed that the adjacent faces of the arm 24 and the head 21 are of a considerable width so that considerable friction will be applied between the two for the purpose of rigidly holding the arm 24 against swinging about the pin 22, as clearly shown in Figure 1. The head member 21 is of such length that each end of its under surface rests on top of the flange 18, while the under surface of the opposite member 19 also rests on the face 18, on the opposite side of the face 18 from which the head member 21 rests.

By this construction, it will be seen that the bracket member is supported at three points on the face 18, and when the said bracket is locked in position by means of the set screw, the same is held rigidly against lateral swinging movement as well as against rotary movement about the pin 12, and is rigidly held against longitudinal movement through the slot 15.

When it is desired to remove the tool holder from the tool rest, the set screw 29 is slightly released, which permits the clamp 28 to be moved longitudinally with the member 20 and the bar 27 until it disengages the outer end of the member 20. The clamp may then be swung about the shaft 27 to a vertical position or to an opposite horizontal position. The set screw 14 is then released and the members 19 and 20 will be moved longitudinally through the slot 15, thereby detaching the bracket and the boring bar from the tool rest, which may be easily and quickly done.

By mounting the boring bar holder on the tool rest of a lathe, it will be seen that the boring bar may be moved either longitudinally or laterally, and it may be swung at any angle relative to either the longitudinal or lateral movement by swinging it about the shaft 12, thereby providing a large number of adjustments for the tool carrying end of the boring bar.

I claim as my invention:

1. A boring bar holder comprising a bracket having a body portion designed to be mounted in a tool holder of a lathe, one end of said body portion being provided with a cylindrical support, the opposite end being provided with a transversely arranged head, said head being provided with a pivot pin, a swinging arm pivotally mounted on said pin, a clamp device pivotally mounted on said cylindrical member, means for detachably securing the boring bar in the free ends of said swinging arm, and said clamp device, and means for locking said swinging arm and said clamp member in any of their positions of swinging movement.

2. In combination, a tool rest provided with a dovetail slot, a headed tool supporting pin in said dovetail slot, a washer on top of said tool rest and around said pin, the upper face of said washer being provided with a concave portion to form an annular faced portion near its periphery, the upper end of said headed pin being provided with a tool supporting slot, and a set screw, a boring bar bracket comprising a body portion designed to enter the slot of said tool supporting pin and to have one end rest on the upper annular face of said washer, the opposite end of said body portion being provided with a transversely arranged head, each end of the lower face of said head being designed to rest on the annular face of said washer so that the body portion of said bracket will be supported at substantially three points, and means for adjustably and detachably mounting a boring bar to said bracket.

3. In combination, a tool rest provided with a dovetail slot, a headed tool supporting pin in said dovetail slot, a washer on top of said tool rest and around said pin, the upper face of said washer being provided with a concave portion to form an annular faced portion near its periphery, the upper end of said headed pin being provided with a tool supporting slot, and a set screw, a boring bar bracket comprising a body portion designed to enter the slot of said tool supporting pin and to have one end rest on the upper annular face of said washer, the opposite end of said body portion being provided with a transversely arranged head, each end of the lower face of said head being designed to rest on the annular face of said washer so that the body portion of said bracket will be supported at substantially three points, a swinging arm pivoted to the head member of said bracket, means for locking said swinging arm in a number of its swinging positions, means for pivotally mounting the clamping member to the opposite end of said bracket so the said clamping member and said swinging arm may swing in a common plane, and means for detachably and adjustably securing a boring bar in the free ends of said swinging member and said clamping members.

Des Moines, Iowa, May 17, 1922.

DAVID S. ANTHONY.